United States Patent
Lu et al.

(10) Patent No.: US 11,943,097 B2
(45) Date of Patent: Mar. 26, 2024

(54) PARAMETER CONFIGURATION METHOD, TERMINAL DEVICE AND STORAGE MEDIUM

(71) Applicant: GUANGDONG OPPO MOBILE TELECOMMUNICATIONS CORP., LTD., Guangdong (CN)

(72) Inventors: Qianxi Lu, Guangdong (CN); Zhenshan Zhao, Guangdong (CN); Huei-Ming Lin, South Yarra (AU)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/204,195

(22) Filed: Mar. 17, 2021

(65) Prior Publication Data
US 2021/0203548 A1  Jul. 1, 2021

Related U.S. Application Data

(63) Continuation of application No. PCT/CN2019/082939, filed on Apr. 16, 2019.

(30) Foreign Application Priority Data

Oct. 19, 2018  (WO) ................ PCT/CN2018/111106
Oct. 29, 2018  (WO) ................ PCT/CN2018/112509
Nov. 23, 2018  (WO) ................ PCT/CN2018/117315

(51) Int. Cl.
*H04L 41/0803* (2022.01)
*H04L 41/5003* (2022.01)
(Continued)

(52) U.S. Cl.
CPC ...... *H04L 41/0803* (2013.01); *H04L 41/5003* (2013.01); *H04L 41/5041* (2013.01); *H04W 4/40* (2018.02)

(58) Field of Classification Search
None
See application file for complete search history.

(56) References Cited

U.S. PATENT DOCUMENTS

2018/0206140 A1* 7/2018 Panteleev ........... H04W 72/044
2018/0227821 A1   8/2018 Tsai et al.
(Continued)

FOREIGN PATENT DOCUMENTS

CN     105451211 A     3/2016
CN     107370561 A     11/2017
(Continued)

OTHER PUBLICATIONS

3GPP TSG-RAN WG1 Meeting #76bis—R1-141390—Shenzhen, China, Mar. 31-Apr. 4, 2014—Ericsson, On resource allocation for D2D communication (6 pages).
(Continued)

*Primary Examiner* — Kenny S Lin
(74) *Attorney, Agent, or Firm* — PERKINS COIE LLP (57) ABSTRACT

Disclosed is a parameter configuration method, comprising: a second terminal device sending a first parameter combination to a first terminal device, or the first terminal device sending a second parameter combination to the second terminal device, wherein the first parameter combination and the second parameter combination are both used for indicating a sidelink data sending parameter of the second terminal device and/or a sidelink data receiving parameter of the second terminal device. Further disclosed are a terminal device and a storage medium.

9 Claims, 3 Drawing Sheets

(51) Int. Cl.
*H04L 41/5041* (2022.01)
*H04W 4/40* (2018.01)

(56) References Cited

U.S. PATENT DOCUMENTS

| | | | |
|---|---|---|---|
| 2018/0234524 A1* | 8/2018 | Cheng | H04W 76/15 |
| 2018/0332585 A1* | 11/2018 | Faurie | H04W 4/70 |
| 2018/0376304 A1* | 12/2018 | Cheng | H04W 4/40 |
| 2019/0044667 A1* | 2/2019 | Guo | H04L 1/1816 |
| 2019/0052446 A1* | 2/2019 | Cheng | H04W 72/0453 |
| 2019/0053251 A1* | 2/2019 | Loehr | H04W 72/10 |
| 2019/0090107 A1* | 3/2019 | Kim | H04W 76/11 |
| 2019/0124489 A1* | 4/2019 | Ahmad | H04W 4/70 |
| 2019/0124491 A1* | 4/2019 | Lim | H04W 52/146 |
| 2019/0268732 A1* | 8/2019 | Lu | H04W 4/12 |
| 2019/0313315 A1* | 10/2019 | Xu | H04W 36/30 |
| 2019/0320475 A1* | 10/2019 | Li | H04W 8/005 |
| 2019/0327732 A1 | 10/2019 | Yoon | |
| 2019/0364484 A1* | 11/2019 | Kim | H04W 48/10 |
| 2020/0059915 A1* | 2/2020 | Lee | H04W 72/0406 |
| 2020/0092692 A1* | 3/2020 | Wang | H04W 76/14 |
| 2020/0296738 A1* | 9/2020 | Inokuchi | H04W 72/1268 |
| 2021/0051627 A1* | 2/2021 | Lee | H04W 72/12 |
| 2021/0314962 A1* | 10/2021 | Ashraf | H04W 24/10 |

FOREIGN PATENT DOCUMENTS

| | | |
|---|---|---|
| CN | 107534828 A | 1/2018 |
| CN | 107580340 A | 1/2018 |
| CN | 108029115 A | 5/2018 |
| KR | 20180036476 A | 4/2018 |
| WO | 2016144574 A1 | 9/2016 |
| WO | 2016181095 A1 | 11/2016 |
| WO | 2017134235 A1 | 8/2017 |
| WO | 2017173579 A1 | 10/2017 |
| WO | 2017206168 A1 | 12/2017 |

OTHER PUBLICATIONS

International Search Report dated Jul. 18, 2019 of PCT/CN2019/082939 (4 pages).
International Search Report dated May 21, 2019 of PCT/CN2018/112509 (4 pages).
International Search Report dated Apr. 28, 2019 of PCT/CN2018/117315 (4 pages).
International Search Report dated May 29, 2019 of PCT/CN2018/111106 (4 pages).
Examination Report No. 1 for Australian Application No. 2019362939 dated Dec. 1, 2021. 3 pages.
Extended European Search Report for European Application No. 19873694.4 dated Nov. 9, 2021. 9 pages.
Intel Corp. "Sidelink Feedback Information and Signalling for Wearable and IoT Use Cases" R1-1712521; 3GPP TSG RAN WG1 Meeting #90; Prague, Czech Republic, Aug. 21-25, 2017. 5 pages.
InterDigital, Inc. "QoS Management for NR V2X" R1-1811116; 3GPP TSF RAN WG1 Meeting #94bis; Chengdu, China; Oct. 8-12, 2018. 4 pages.
Examination Report of the European application No. 19873694.4, dated Jul. 4, 2022. 7 pages.
First Office Action of the Japanese application No. 2021-520976, dated Jun. 17, 2022. 10 pages with English Translation.
Lenovo "Connection establishment for Unicast in NR V2X" R2-1814503; 3GPP TSG-RAN WG2 Meeting #103b; Chengdu, China, Oct. 8-12, 2018. 6 pages.
SA2 "Reply LS on PC5 transmission mechanism selection" R1-1805380; 3GPP TSG RAN WG1 Meeting #92bis; Sanya, China, Apr. 16-20, 2018. 7 pages.
Ericsson "On Path Configuration" Tdoc R2-1700930; 3GPP TSG RAN WG2 #97; Athens, Greece; Feb. 13-17, 2017. 3 pages.
Examination Report for Indian Application No. 202127021478 dated Aug. 18, 2022. 5 pages with English translation.
First Office Action for Chinese Application No. 202110429105.9 dated Aug. 12, 2022. 19 pages with English translation.
Decision of Refusal for Japanese Application No. 2021-520976 dated Dec. 13, 2022. 8 pages with English translation.
Summons to Attend Oral Proceedings for European Application No. 19873694.4 issued Jan. 19, 2023. 9 pages.

* cited by examiner

| A second terminal device sends a first parameter combination to a first terminal device | S201 |

FIG. 4

| A first terminal device sends a second parameter combination to a second terminal device | S301 |

FIG. 5

A second terminal device 400

A first sending unit 401

PARAMETER CONFIGURATION METHOD, TERMINAL DEVICE AND STORAGE MEDIUM

CROSS-REFERENCE TO RELATED APPLICATIONS

This application is a continuation application of International PCT Application No. PCT/CN2019/082939 filed on Apr. 16, 2019, which claims priorities to the International PCT Application No. PCT/CN2018/111106 filed on Oct. 19, 2018, the International PCT Application No. PCT/CN2018/112509 filed on Oct. 29, 2018, and the International PCT Application No. PCT/CN2018/117315 filed on Nov. 23, 2018. The present application claims priorities and benefits of the above-identified applications and the above-identified applications are incorporated by reference herein in their entireties.

TECHNICAL FIELD

The disclosure relates to a technical field of wireless communication, in particular to a parameter configuration method, a terminal device and a storage medium.

BACKGROUND

In Vehicle to Everything (V2X) of a fifth generation (5G) New Radio (NR) system, control of a User Equipment (UE) to a UE is introduced. However, there is no effective solution regarding how to achieve UE-UE control.

SUMMARY

Embodiments of the present disclosure provide a parameter configuration method, a terminal device and a storage medium.

In a first aspect, an embodiment of the present disclosure provides a parameter configuration method, including: sending, by a second terminal device, a first parameter combination to a first terminal device, wherein the first parameter combination is used for indicating sidelink data sending parameters of the second terminal device and/or sidelink data receiving parameters of the second terminal device.

In a second aspect, an embodiment of the present disclosure provides a parameter configuration method, including: sending, by a first terminal device, a second parameter combination to a second terminal device, wherein the second parameter combination is used for indicating sidelink data sending parameters of the second terminal device and/or sidelink data receiving parameters of the second terminal device.

In a third aspect, an embodiment of the present disclosure provides a second terminal device, which includes: a first sending unit, configured to send a first parameter combination to a first terminal device, wherein the first parameter combination is used for indicating sidelink data sending parameters of the second terminal device and/or sidelink data receiving parameters of the second terminal device.

In a fourth aspect, an embodiment of the present disclosure provides a first terminal device, which includes: a second sending unit, configured to send a second parameter combination to a second terminal device, wherein the second parameter combination is used for indicating sidelink data sending parameters of the second terminal device and/or sidelink data receiving parameters of the second terminal device.

In a fifth aspect, an embodiment of the present disclosure provides a terminal device, including: a processor and a memory used for storing a computer program that is capable of being run on the processor; wherein the processor is used for running the computer program to perform acts of the above parameter configuration method.

In a sixth aspect, an embodiment of the present disclosure provides a storage medium in which an executable program is stored, wherein when the executable program is executed by a processor, the above parameter configuration method is implemented.

According to a parameter configuration method provided by embodiments of the present disclosure, a first parameter combination is sent to a first terminal device through a second terminal device, or a second parameter combination is sent to the second terminal device through the first terminal device, wherein both the first parameter combination and the second parameter combination are used for indicating sidelink data sending parameters and/or sidelink data receiving parameters of the second terminal device. As such, both the first terminal device and the second terminal device know the data sending parameters of the second terminal device and/or the data receiving parameters of the second terminal device, thus achieving control of a terminal device to a terminal device.

BRIEF DESCRIPTION OF DRAWINGS

FIG. 5 is a schematic diagram of another optional processing flow of a parameter configuration method according to an embodiment of the present disclosure.

DETAILED DESCRIPTION

To understand features and technical contents of embodiments of the present disclosure in more detail, implementations of the embodiments of the present disclosure will be described in detail below with reference to accompanying drawings. The accompanying drawings are used for reference only and are not intended to limit embodiments of the present disclosure.

Before describing embodiments of the present disclosure in detail, a V2X system will be briefly explained.

A V2X system is a Sidelink (SL) transmission technology based on Device-to-Device (D2D) communication. Different from a way in which communication data is received or sent through a base station in a conventional LTE system, communication data in the V2X system is directly communicated from a terminal to a terminal, thus having a higher spectrum efficiency and a lower transmission latency.

In Release 14 (Rel-14) of 3GPP, V2X is standardized, and two transmission modes are defined: mode 3 and mode 4.

Figure 1:
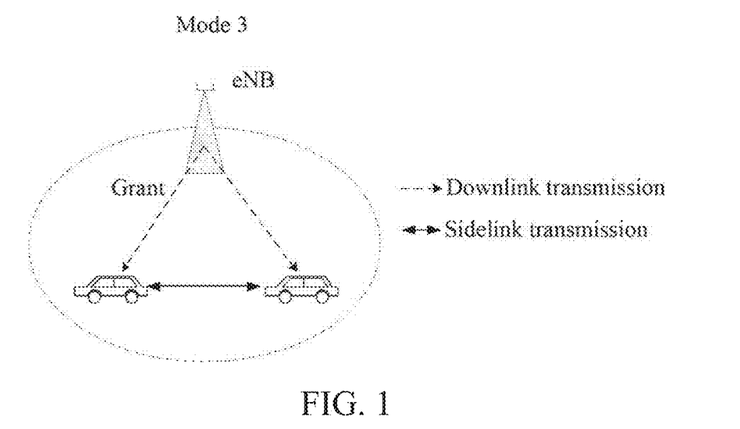
FIG. 1 is a schematic diagram of a processing flow of data transmission corresponding to mode 3 according to the present disclosure.

As for mode 3, a procedure of data transmission is as shown in FIG. 1. Sidelink transmission resource of a vehicle-mounted terminal is allocated by a base station. The vehicle-mounted terminal sends data on a sidelink according to the resource allocated by the base station. The base station may allocate, to the terminal, a resource for a single transmission or a resource for a semi-static transmission.

Figure 2:
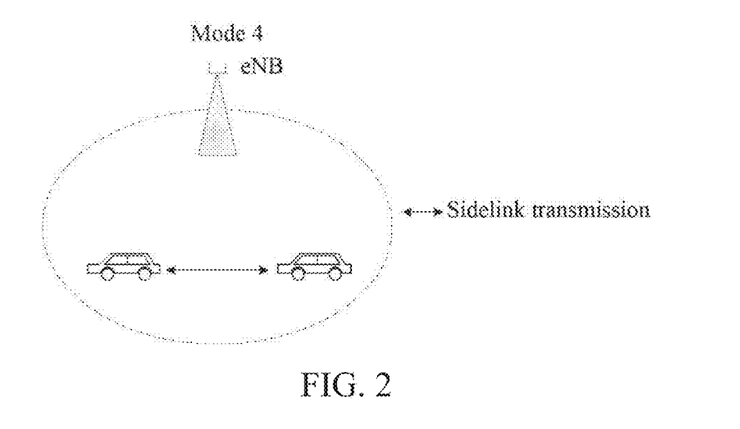
FIG. 2 is a schematic diagram of a processing flow of data transmission corresponding to mode 4 according to the present disclosure.

As for mode 4, a procedure of data transmission is as shown in FIG. 2. A vehicle-mounted terminal adopts a transmission mode of sensing and reservation. The vehicle-mounted terminal acquires a set of available transmission resources in a resource pool by sensing, and the terminal randomly selects a resource from the set to perform a sidelink data transmission. Since services in the V2X system have a periodic character, the terminal usually adopts a semi-static transmission mode, that is, after selecting a transmission resource, the terminal will persistently use the resource in a plurality of transmission periods, thus reducing probabilities of a resource re-selection and a resource conflict. The terminal will carry information of a resource reserved for next transmission in control information of a current transmission, so that other terminals may determine whether the resource is reserved and used by a user by detecting control information of the user, thus achieving a purpose of reducing resource conflicts.

UE-UE control is introduced into NR-V2X. However, there is no effective solution regarding how to achieve UE-UE control, such as how to trigger capability interaction and mutual control of UE-UE, in what granularity to perform interaction control, how to decide a controlling end and a controlled end, and how to deal with abnormal situations.

Therefore, a parameter configuration method is provided by the present application. The parameter configuration methods of embodiments of the present application may be applied to various communication systems, such as a Global System of Mobile communication (GSM) system, a Code Division Multiple Access (CDMA) system, a Wideband Code Division Multiple Access (WCDMA) system a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a 5G system, etc.

Figure 3:
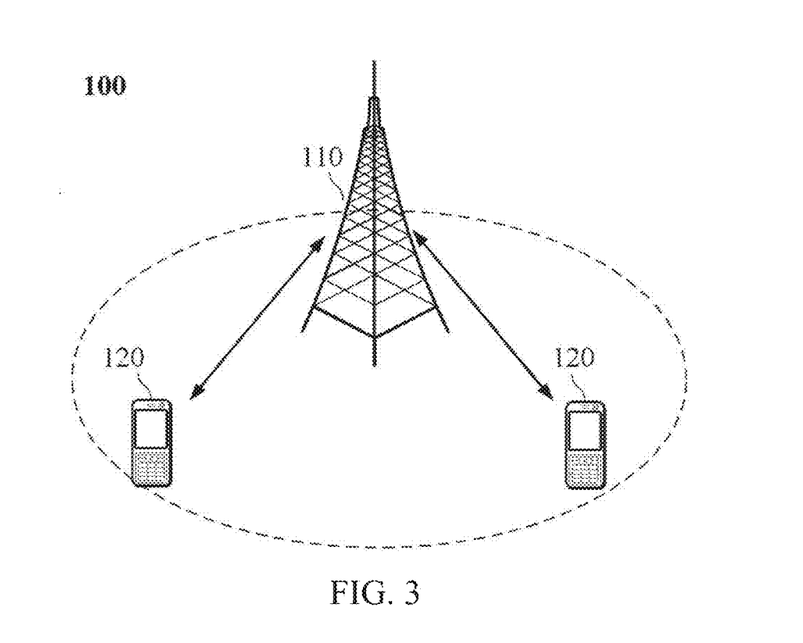
FIG. 3 is a schematic diagram of composition structure of a communication system according to an embodiment of the present disclosure.

Illustratively, a communication system 100 applied in an embodiment of the present application is as shown in FIG. 3. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 10 also includes at least one terminal device 120 located within the coverage area of the network device 110. As used herein, the term "terminal device" includes, but not limited to, a device configured to receive/send a communication signal via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or another communication terminal; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal that can be combined with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver.

The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN), or the like.

Optionally, Device to Device (D2D) communication may be performed between the terminal devices 120.

Optionally, the 5G system or 5G network may be referred to as a New Radio (NR) system or a NR network.

FIG. 3 illustratively shows one network device and two terminal devices as an example. Optionally, the communication system 100 may include a plurality of network devices, and other quantity of terminal devices may be included within a coverage area of each network device, and this is not limited in the embodiments of the present application.

Optionally, the communication system 100 may include other network entities such as a network controller, and a mobile management entity, which is not limited in the embodiments of the present application.

It should be understood that, a device with a communication function in a network/system in embodiments of the present application may be referred to as a communication device.

Taking the communication system 100 shown in FIG. 3 as an example, the communication devices may include a network device 110 and a terminal device 120 which have communication functions. The network device 110 and the terminal device 120 may be specific devices described above, which will not be described here again. The communication devices may also include other devices in the communication system 100, such as network controllers, mobile management entities, and other network entities, which is not limited in the embodiments of the present application.

Figure 4:
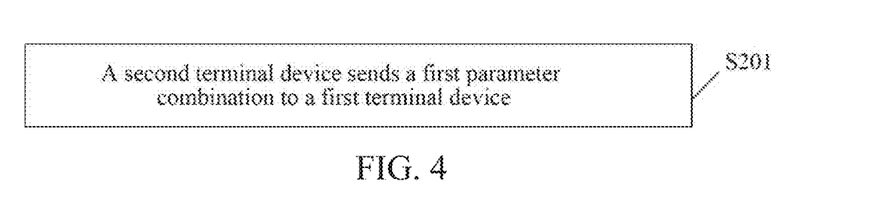
FIG. 4 is a schematic diagram of an optional processing flow of a parameter configuration method according to an embodiment of the present disclosure.

As shown in FIG. 4, an optional processing flow of a parameter configuration method provided by an embodiment of the present disclosure includes the following step S201.

In step S201, a second terminal device sends a first parameter combination to a first terminal device.

In an embodiment of the present disclosure, the first parameter combination is used for indicating sidelink data sending parameters of the second terminal device, or the first parameter combination is used for indicating sidelink data receiving parameters of the second terminal device, or the first parameter combination is used for indicating sidelink data sending parameters and sidelink data receiving parameters of the second terminal device. The second terminal device and the first terminal device are different terminal devices.

In some embodiments, the second terminal device may send the first parameter combination to the first terminal device by a Physical Sidelink Control Channel (PSCCH), a Physical Sidelink Shared Channel (PSSCH), a sidelink feedback channel, or a Physical Sidelink Discovery Channel (PSDCH), etc.

In some embodiments, the first parameter combination is transmitted through higher layer signaling, that is, the second terminal device sends the first parameter combination to the first terminal device through higher layer signaling. Optionally, the first parameter combination is transmitted by higher layer signaling through a container.

In other embodiments, the first parameter combination is transmitted through Radio Resource Control (RRC) signaling, that is, the second terminal device sends the first parameter combination to the first terminal device through RRC signaling.

In a specific implementation, that the second terminal device sends the first parameter combination to the first terminal device may be triggered by a higher layer message of the second terminal device or a first message of the first terminal device. The higher layer message is carried within RRC signaling and sent to the first terminal device simultaneously with the first parameter combination. The higher layer message includes at least one of the following: a connection establishment request message DIRECT_COMMUNICATION_REQUEST, a security parameter configuration message DIRECT_SECURITY_MODE_COMMAND, a security parameter configuration complete message DIRECT_SECURITY_MODE_COMPLETE, and a connection establishment complete message DIRECT_COMMUNICATION_ACCEPT.

In a specific implementation, that the second terminal device sends the first parameter combination to the first terminal device may be triggered by an access layer of the second terminal device. As an example, the second terminal device triggers the second terminal device to send the first parameter combination to the first terminal device when a sidelink data sending capability of the second terminal device and/or a sidelink data receiving capability of the second terminal device changes.

It may be understood that the higher layer message of the second terminal device triggers the second terminal device to send the first parameter combination to the first terminal device, or a first message sent by the first terminal device triggers the second terminal device to send the first parameter combination to the first terminal device. Regardless of whether the sending of the first parameter combination is implemented through triggering by the higher layer message of the second terminal device or through triggering by the first message of the first terminal device, the triggering may be periodic. That is, the higher layer of the second terminal device periodically triggers the second terminal device to send the first parameter combination to the first terminal device. Or the first terminal device periodically sends a first message to trigger the second terminal device to send the first parameter combination to the first terminal device.

Here, the first message is used for indicating a type of a first parameter in the first parameter combination that the second terminal needs to send. For example, the first parameter in the first parameter combination includes different dimensions, such as a Quality of Service (QoS) attribute, a propagation mode, an identifier of the second terminal device, a target address, a source address, a provider service identifier (PSID), an intelligent transportation system-application identification (ITS-AID), a radio access type (RAT), and parameter configuration information issued by the higher layer of the second terminal device. Optionally, the types of the first parameter in embodiments of the present disclosure are different dimensions of the first parameters. Herein, propagation modes include unicast, multicast and broadcast, and RATs include access in a NR system and access in an LTE system.

The first message is further used for indicating the sidelink data sending parameters of the first terminal device and/or the sidelink data receiving parameters of the first terminal device. Optionally, the first message indicates that the sidelink data sending parameters that the second terminal needs to transmit are sending parameters compatible with the receiving parameters of the first terminal. The first message indicates that the receiving parameters of the sidelink data that the second terminal needs to send are receiving parameters compatible with the sending parameters of the first terminal.

The first message is a PC5-signaling message, an RRC message, a connection establishment request message, a security parameter configuration message, a security parameter configuration complete confirmation message, or a connection establishment complete confirmation message.

In some embodiments, when sending by the second terminal device the first parameter combination to the first terminal device is triggered by the first message sent by the first terminal device, the method further includes: sending, by the second terminal device, a third message to the first terminal device, wherein the third message is used for indicating a type of a third parameter in a third parameter combination that the first terminal device needs to send. The third message and the first parameter combination are transmitted using a same RRC message.

The first parameter is configured according to different situations by the first parameter combination sent by the second terminal device to the first terminal device. The first parameter includes a sidelink data sending parameter of the second terminal device, a sidelink data receiving parameter of the second terminal device, or a sidelink data sending parameter and a receiving parameter of the second terminal device.

The situations include at least one of the following: Quality of Service (QoS), a propagation mode, an identifier of the second terminal device, a target address, a source address, a Provider Service Identifier (PSID), an intelligent transportation systems application-identifier (ITS-AID), a Radio Access Type (RAT), and parameter configuration information issued by a higher layer of the second terminal device.

When the first parameter combination includes a QoS attribute, the first parameter combination is used for indicating that the second terminal device requires initiating a service with the QoS attribute. Or, when the first parameter combination includes a Quality of Service (QoS) attribute, the first parameter combination is used for indicating that the second terminal device requires releasing the service with the QoS attribute.

Therefore, according to embodiments of the present disclosure, based on any one or more of a propagation mode, an identifier of the second terminal device, a target address, a source address, PSID and ITS-AID, the sidelink data sending parameters and/or the sidelink data receiving parameters of the second terminal device are configured.

In an embodiment of the present disclosure, the first parameter combination includes at least one of the following: sending resources of the second terminal device, receiving resources of the second terminal device, related information of sending resource pool of the second terminal device, related information of receiving resource pool of the second terminal device, and related information of transmission power of the second terminal device.

Optionally, the first parameter combination includes at least one of the following: a QoS attribute, a propagation mode, an identifier of the second terminal device, a target address, a source address, a PSID, an ITS-AID, a Radio Access Type (RAT), and parameter configuration information issued by a higher layer of the second terminal device. Herein, propagation modes include unicast, multicast and broadcast, and RATs includes access in NR system and access in LTE system.

In some embodiments, the sidelink data receiving parameters of the second terminal device include at least one of the following: a Reference Signal Receiving Power (RSRP) of the sidelink of the second terminal device, a Reference Signal Receiving Quality (RSRQ) of the sidelink of the second terminal device, and a Received Signal Strength Indication (RSSI) of the sidelink of the second terminal device.

The sidelink of the second terminal device includes the sidelink between the second terminal device and the first terminal device and/or the sidelink between the second terminal device and the third terminal device. The first terminal device is different from the third terminal device.

In an embodiment of the present disclosure, the first parameter combination is determined by the second terminal device according to an existing service, or the first parameter combination is determined by the second terminal device according to a newly generated service.

Another optional processing flow of the parameter configuration method provided by an embodiment of the present disclosure, as shown in FIG. 5, includes the following step S301.

In step S301, the first terminal device sends a second parameter combination to the second terminal device.

In an embodiment of the present disclosure, the second parameter combination is used to indicate the sidelink data sending parameters of the second terminal device, or the second parameter combination is used to indicate the sidelink data receiving parameters of the second terminal device, or the second parameter combination is used to indicate the sidelink data sending parameters and receiving parameters of the second terminal device. The second terminal device and the first terminal device are different terminal devices.

In some embodiments, the first terminal device may send the second parameter combination to the second terminal device through PSCCH. PSSCH, sidelink feedback channel, or PSDCH, etc.

In some embodiments, the second parameter combination is transmitted through higher layer signaling, that is, the first terminal device sends the second parameter combination to the second terminal device through higher layer signaling. Optionally, the second parameter combination is transmitted by higher layer signaling through a container.

In other embodiments, the second parameter combination is transmitted through RRC signaling, that is, the first terminal device sends the second parameter combination to the second terminal device through RRC signaling.

In specific implementation, that the first terminal device sends the second parameter combination to the second terminal device can be triggered by a higher layer message of the first terminal device or triggered by a second message of the second terminal device. The higher layer message is carried in RRC signaling, and is sent to the second terminal device simultaneously with the second parameter combination. The higher layer message includes at least one of the following a connection establishment request message, a security parameter configuration message, a security parameter configuration complete message and a connection establishment complete message.

In some embodiments, that the first terminal device sends the second parameter combination to the second terminal device can be triggered by the access layer of the first terminal device.

In specific implementation, the first terminal device receives a fifth parameter combination sent by the second terminal device, wherein the fifth parameter combination is used for indicating the sidelink data sending parameters of the first terminal device and/or the sidelink data receiving parameters of the second terminal device; The first terminal device configures the fifth parameter combination, and triggers the first terminal device to send the second parameter combination to the second terminal device when the first terminal device successfully configures the fifth parameter combination. It can be understood that successfully configuring, by the first terminal device, the fifth parameter combination is the triggering, by the access layer of the first terminal device, the first terminal device to send the second parameter combination to the second terminal device.

It can be understood that the higher layer of the first terminal device triggers the first terminal device to send the second parameter combination to the second terminal device, or the second message of the second terminal device triggers the first terminal device to send the second parameter combination to the second terminal device. Whether it is triggered by the higher layer of the first terminal device or triggered by the second message of the second terminal device, the sending of the second parameter combination can be triggered periodically. That is, the higher layer of the first terminal device periodically triggers the first terminal device to send the second parameter combination to the second terminal device, or the second terminal device periodically sends the second message to the first terminal device to trigger the first terminal device to send the second parameter combination to the second terminal device.

Herein, the second message is PC5-signaling message, RRC message, connection establishment request message, security parameter configuration message, security parameter configuration confirmation message, or connection establishment complete confirmation message.

The second parameter is configured according to different situations by the second parameter combination sent by the first terminal device to the second terminal device. The second parameter includes a sidelink data sending parameter of the second terminal device, or a sidelink data receiving parameter of the second terminal device, or the second parameter includes a sidelink data sending parameter and a receiving parameter of the second terminal device.

The situations include at least one of the following: a QoS attribute, a propagation mode, an identifier of the second terminal device, a target address, a source address, a PSID, an ITS-AID, a RAT, and parameter configuration information issued by a higher layer of the second terminal device.

Therefore, according to the embodiment of the present disclosure, based on any one or more of a propagation mode, an identifier of the second terminal device, a target address, a source address, a PSID and an ITS-AID, the sidelink data sending parameters and/or receiving parameters of the second terminal device are configured.

In an embodiment of the present disclosure, the second parameter combination includes at least one of the following: sending resources of the second terminal device, receiving resources of the second terminal device, related information of a sending resource pool of the second terminal device, related information of a receiving resource pool of the second terminal device, and related information of a transmission power of the second terminal device.

In some embodiments, the description of the second parameter combination is same as that of the aforementioned first parameter combination, and will not be repeated here. The description of the sidelink of the second terminal device is same as that of the sidelink of the second terminal device mentioned in above embodiments of the present disclosure, and will not be repeated here.

According to another optional processing flow of a parameter configuration method provided by an embodiment of the present disclosure, step S302 is added on a basis of above step S301.

In step S302, the first terminal device receives third information sent by the second terminal device.

In an embodiment of the present disclosure, the third information indicates that the second terminal device has completed a configuration of the second parameter combination, or that the second terminal device refuses to configure the second parameter combination, or that the second terminal device fails to configure the second parameter combination.

When the third information indicates that the second terminal device fails to configure the second parameter combination, the third information indicates a third parameter combination selected by the second terminal device, or a fourth parameter combination being used by the second terminal device. Or the third information is used for indicating that the second terminal device requires reestablishing a sidelink connection with the first terminal device.

In an optional embodiment, before the second terminal device sends the third information, the second terminal device uses a previous configuration of the second parameter combination. Or before the second terminal device sends the third information, the second terminal device stops at least one radio bearer.

The third parameter combination selected by the second terminal device refers to a third parameter combination provided by the second terminal device or a third parameter combination suggested by the second terminal device.

In some embodiments, the method further includes: receiving, by the first terminal device, a sixth parameter combination sent by the second terminal device, wherein the sixth parameter combination is used for indicating at least one of the following: sidelink data sending parameters of the first terminal device and sidelink data receiving parameters of the first terminal device.

The sixth parameter combination and the third information are transmitted using a same RRC message.

In some embodiments, information included in the third parameter combination and the fourth parameter combination is the same as information included in aforementioned first parameter combination, which will not be described in detail here.

Figure 6:
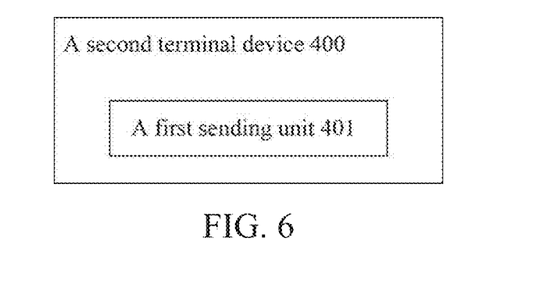
FIG. 6 is a schematic diagram of composition structure of a second terminal device according to an embodiment of the present disclosure.

An embodiment of the present disclosure further provides a second terminal device, wherein a schematic diagram of composition structure of the second terminal device 400 is shown in FIG. 6. The second terminal device includes: a first sending unit 401, configured to send a first parameter combination to a first terminal device, wherein the first parameter combination is used for indicating sidelink data sending parameters of the second terminal device and/or sidelink data receiving parameters of the second terminal device.

In the embodiment of the present disclosure, the first parameter combination is transmitted through higher layer signaling. Optionally, the first parameter combination is transmitted by higher layer signaling through a container. Or the first parameter combination is transmitted through RRC signaling.

In the embodiment of the present disclosure, that the first sending unit 401 sends the first parameter combination to the first terminal device is triggered by a higher layer of the second terminal device or triggered by a first message of the first terminal device. The first message is used for indicating at least one of the following: the sidelink data sending parameters of the first terminal device and the sidelink data receiving parameters of the first terminal device.

In the embodiment of the present disclosure, that the first sending unit 401 sends the first parameter combination to the first terminal device is implemented by periodic triggering.

In the embodiment of the present disclosure, the first message is a PC5-signaling message, an RRC message, a connection establishment request message, a security parameter configuration message, a security parameter configuration complete confirmation message, or a connection establishment complete confirmation message.

In the embodiment of the present disclosure, the first parameters include sidelink data sending parameters of the second terminal device and/or sidelink data receiving parameters of the second terminal device. Situations include at least one of the following: a QoS attribute, a propagation mode, an identifier of the second terminal device, a target address, a source address, a PSID, an ITS-AID, a RAT, and parameter configuration information issued by the higher layer of the second terminal device.

In some embodiments, the first sending unit 401 is further configured to send a third message to the first terminal device, wherein the third message is used for indicating a type of a third parameter in a third parameter combination that the first terminal device needs to send. The third message and the first parameter combination are transmitted using a same RRC message.

Herein, related description of the first parameter combination is same as that of the first parameter combination mentioned in above embodiments of the present disclosure, and will not be repeated herein. The description of a sidelink of the second terminal device is same as that of a sidelink of the second terminal device mentioned in above embodiments of the present disclosure, and will not be repeated herein. Related descriptions for a higher layer message and the first message are same as those in the parameter configuration method performed by the second terminal device, and will not be repeated herein.

Figure 7:
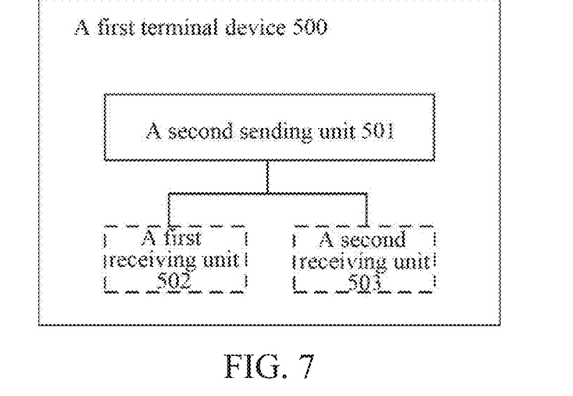
FIG. 7 is a schematic diagram of composition structure of a first terminal device according to an embodiment of the present disclosure.

An embodiment of the present disclosure also provides a first terminal device, and a schematic diagram of composition structure of the first terminal device 500 is shown in FIG. 7. The first terminal device includes: a second sending unit 501, configured to send a second parameter combination to a second terminal device, wherein the second parameter combination is used for indicating sidelink data sending parameters of the second terminal device and/or sidelink data receiving parameters of the second terminal device.

In the embodiment of the present disclosure, the second parameter combination is transmitted through higher layer signaling. Optionally, the second parameter combination is transmitted by higher layer signaling through a container.

In the embodiment of the present disclosure, the second parameter combination is transmitted through RRC signaling.

In the embodiment of the present disclosure, that the second sending unit 501 sends the second parameter combination to the second terminal device is triggered by a higher layer of the first terminal device. The higher layer message is carried in RRC signaling and sent to the second terminal device simultaneously with the second parameter combination.

In the embodiment of the present disclosure, the higher layer message includes at least one of following: a connection establishment request message, a security parameter configuration message, a security parameter configuration complete message and a connection establishment complete message.

In the embodiment of the present disclosure, that the second sending unit 501 sends the second parameter combination to the second terminal device is triggered by a second message from the second terminal device.

In the embodiment of the present disclosure, that the second sending unit 501 sends the second parameter combination to the second terminal device is implemented by a periodic triggering.

Herein, the second message is a PC5-signaling message, an RRC message, a connection establishment request message, a security parameter configuration message, a security parameter configuration complete confirmation message, or a connection establishment complete confirmation message.

In the embodiment of the present disclosure, the second parameter combination is used for configuration of the second parameter for different situations. The second parameter includes a sidelink data sending parameter of the second terminal device and/or a sidelink data receiving parameter of the second terminal device. The situations include at least one of the following: a propagation mode, an identifier of the second terminal device, a target address, a source address, a PSID and an ITS-AID.

In the embodiment of the present disclosure, that the second sending unit 501 sends the second parameter combination to the second terminal device is triggered by an access layer of the first terminal device.

When that the second sending unit 501 sends the second parameter combination to the second terminal device is triggered by the access layer of the first terminal device, the second sending unit 501 is configured to receive a fifth parameter combination sent by the second terminal device, wherein the fifth parameter combination is used for indicating sidelink data sending parameters of the first terminal device and/or sidelink data receiving parameters of the second terminal device, and that the first terminal device successfully configures the fifth parameter combination.

In some embodiments, the first terminal device further includes a first receiving unit 502, configured to receive third information sent by the second terminal device.

The third information indicates that the second terminal device completes configuring the second parameter combination, or that the second terminal device refuses to configure the second parameter combination, or that the second terminal device fails to configure the second parameter combination.

When the third information indicates that the second terminal device fails to configure the second parameter combination, the third information indicates a third parameter combination selected by the second terminal device or a fourth parameter combination being used by the second terminal device.

In some embodiments, the first terminal device further includes: a second receiving unit 503, configured to receive a sixth parameter combination sent by the second terminal device, wherein the sixth parameter combination is used for indicating at least one of following: sidelink data sending parameters of the first terminal device; and sidelink data receiving parameters of the first terminal device.

The sixth parameter combination and the third information are transmitted using a same RRC message.

In embodiments of the present disclosure, related descriptions of the second parameter combination, the third parameter combination and the fourth parameter combination are same as those of second parameter combination, third parameter combination and fourth parameter combination mentioned in above embodiments of the present disclosure, and will not be repeated herein. The description of a sidelink of the second terminal device in the embodiment of the present disclosure is same as that of a sidelink of the second terminal device mentioned in above embodiments of the present disclosure, and will not be repeated here.

An embodiment of the present disclosure also provides a terminal device, including a processor and a memory configured to store a computer program which is capable of being run on the processor, wherein the processor is configured to execute acts of the above method when running the computer program.

Figure 8:
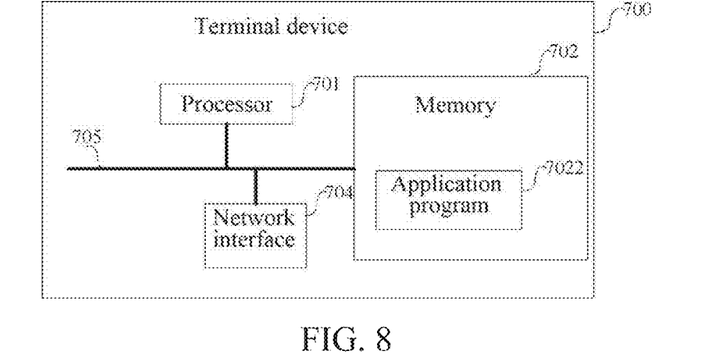
FIG. 8 is a schematic diagram of hardware composition structure of a terminal device according to an embodiment of the present disclosure.

FIG. 8 is a schematic diagram of hardware composition structure of a terminal device (a first terminal device and a second terminal device) of an embodiment of the present disclosure. The terminal device 700 includes at least one processor 701, a memory 702 and at least one network interface 704. Various components in the terminal device 700 are coupled together by a bus system 705. It may be understood that the bus system 705 is used for implementing connection and communication between these components. In addition to a data bus, the bus system 705 includes a power bus, a control bus, and a status signal bus. However, for clarity, all kinds of buses are uniformly referred to as a bus system 705 in the FIG. 8.

It can be understood that the memory 702 may be a volatile memory or a non-volatile memory, or may include both the volatile memory and the non-volatile memory. The non-volatile memory may be a ROM, a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, a compact disk, or a Compact Disc Read-Only Memory (CD-ROM). The magnetic surface memory may be a magnetic disk memory or a magnetic tape memory. The volatile memory may be a Random Access Memory (RAM) which serves as an external cache. By way of exemplary but not restrictive illustrations, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), a Direct Rambus Random Access Memory (DRRAM). The memory 702 described in the embodiment of the present disclosure is intended to include, but is not limited to, these and any other suitable types of memories.

The memory 702 in embodiments of the present disclosure is configured to store various types of data to support operations of the terminal device 700. Examples of such data include any computer program for operating on the terminal device 700, such as an application program 7022. A program for implementing the method of embodiments of the present disclosure may be included in the application program 7022.

Methods disclosed in above embodiments of the present disclosure may be applied in the processor 701 or implemented by the processor 701. The processor 701 may be an integrated circuit chip with a signal processing capability. In an implementation process, the acts of the methods described above may be accomplished by integrated logic circuits of hardware in the processor 701 or instructions in a form of software. The above-mentioned processor 701 may be a general-purpose processor, a Digital Signal Processor (DSP), or other programmable logic devices, discrete gate or transistor logic devices, discrete hardware components, etc. The processor 701 may implement or execute the disclosed methods, acts and logical block diagrams in the embodiments of the present disclosure. The general purpose processor may be a microprocessor or any conventional processor or the like. Acts of the methods disclosed in combination with the embodiments of the present disclosure may be directly embodied as being executed and accomplished by a hardware decoding processor or by a combination of hardware and software modules in a decoding processor. The software module may be located in a storage medium, and the storage medium is located in the memory 702. The processor 701 reads information in the memory 702 and accomplishes the acts of the aforementioned methods in combination with hardware thereof.

In an exemplary embodiment, the terminal device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs or other electronic components, for executing the aforementioned methods.

An embodiment of the present application further provides a storage medium configured to store a computer program.

Optionally, the storage medium may be applied to the terminal device in the embodiment of the present application, and the computer program enables the computer to execute corresponding flow in each method in the embodiment of the present application, which will not be repeated here for brevity.

The present disclosure is described with reference to flowcharts and/or block diagrams of methods, devices (systems), and computer program products of embodiments of the present disclosure. It should be understood that each flow and/or block in the flowchart and/or block diagram, and combinations of flows and/or blocks in the flowchart and/or block diagram may be implemented by computer program instructions. These computer program instructions may be provided to a processor of a general purpose computer, a special purpose computer, an embedded processor or other programmable data processing apparatus to produce a machine, such that the instructions which are executed by the processor of the computer or other programmable data processing apparatus produce means for implementing functions specified in one or more flows in the flow charts and/or one or more blocks in the block diagrams.

These computer program instructions may alternatively be stored in a computer-readable memory that may direct a computer or other programmable data processing apparatus to operate in a specific manner, such that the instructions stored in the computer-readable memory produce an article of manufacture including instruction means that implement the functions specified in one or more flows of the flowchart and/or one or more blocks of the block diagram.

These computer program instructions may alternatively be loaded onto a computer or other programmable data processing apparatus, such that a series of operational steps are performed on the computer or other programmable device to produce a computer-implemented process, such that the instructions executed on the computer or other programmable apparatus provide steps for implementing the functions specified in one or more flows of the flowchart and/or one or more blocks of the block diagram.

The above descriptions are only preferred embodiments of the present disclosure and are not intended to limit a scope of protection of the present disclosure. Any modification, equivalent substitution, improvement, etc. made within the spirit and principles of the present disclosure shall be comprised within the scope of protection of the present disclosure.

What is claimed is:

1. A parameter configuration method, comprising:
    sending, by a second terminal device, a parameter combination to a first terminal device, wherein the parameter combination is used for indicating sidelink data sending parameters of the second terminal device and/or sidelink data receiving parameters of the second terminal device,
    wherein the parameter combination at least comprises: a quality of service (QoS) attribute, a provider service identifier (PSID), or an intelligent transportation system-application identification (ITS-AID),
    wherein when the parameter combination comprises the QoS attribute, the parameter combination is used for indicating that the second terminal device requires initiating a service with the QoS attribute,
    wherein sending, by the second terminal device, the parameter combination to the first terminal device is triggered by a message of the first terminal device,
    wherein the message is a security parameter configuration message,
    wherein the parameter combination is used for different parameter configuration for different situations, and
    wherein the situations include at least one of following: usage of the PSID, or the ITS-AID.

2. The method of claim 1, wherein the parameter combination is transmitted by a higher layer signaling through a container.

3. The method of claim 1, wherein the message of the first terminal device is used for indicating a type of parameters in the parameter combination that the second terminal needs to send.

4. The method of claim 1, wherein the message is used for indicating sidelink data sending parameters of the first terminal device and/or sidelink data receiving parameters of the first terminal device.

5. The method of claim 4, wherein the message is used for indicating that sidelink data sending parameters that the second terminal needs to transmit are sending parameters compatible with the receiving parameters of the first terminal; and for indicating that receiving parameters of the sidelink data that the second terminal needs to send are receiving parameters compatible with the sending parameters of the first terminal.

6. The method of claim 1, wherein the method further comprises:
sending, by the second terminal device, a third message to the first terminal device, wherein the third message is used for indicating a type of a third parameter in a third parameter combination that the first terminal device needs to send, wherein the third message and the first parameter combination are transmitted using a same RRC message.

7. The method of claim 1, wherein the sidelink data receiving parameters of the second terminal device comprise at least one of following:
a reference signal receiving power (RSRP) of a sidelink of the second terminal device;
a reference signal reception quality (RSRQ) of the sidelink of the second terminal device; or
a received signal strength indicator (RSSI) of the sidelink of the second terminal device.

8. A second terminal device, comprising: a processor, and a memory for storing a computer program executable by the processor, wherein the processor is configured to, when executing the computer program, perform an act of:
sending a parameter combination to a first terminal device, wherein the parameter combination is used for indicating sidelink data sending parameters of the second terminal device and/or sidelink data receiving parameters of the second terminal device,
wherein the parameter combination at least comprises: a quality of service (QoS) attribute, a provider service identifier (PSID), or an intelligent transportation system-application identification (ITS-AID),
wherein when the parameter combination comprises the QoS attribute, the parameter combination is used for indicating that the second terminal device requires initiating a service with the QoS attribute,
wherein sending the parameter combination to the first terminal device is triggered by a message sent by the first terminal device,
wherein the message is a security parameter configuration message,
wherein the parameter combination is used for different parameter configuration for different situations, and
wherein the situations comprise at least one of following: usage of the PSID, or the ITS-AID.

9. A non-transitory storage medium storing an executable program, which, when executed by a processor, causes the processor to implement a method, the method comprising:
sending, by a second terminal device, a parameter combination to a first terminal device, wherein the parameter combination is used for indicating sidelink data sending parameters of the second terminal device and/ or sidelink data receiving parameters of the second terminal device,
wherein the parameter combination at least comprises: a quality of service (QoS) attribute, a provider service identifier (PSID), or an intelligent transportation system-application identification (ITS-AID),
wherein when the parameter combination comprises the QoS attribute, the parameter combination is used for indicating that the second terminal device requires initiating a service with the QoS attribute,
wherein sending the parameter combination to the first terminal device is triggered by a message sent by the first terminal device,
wherein the message is a security parameter configuration message,
wherein the parameter combination is used for different parameter configuration for different situations, and
wherein the situations include at least one of following: usage of the PSID the ITS-AID.

* * * * *